(12) United States Patent
Lonnes

(10) Patent No.: US 7,357,151 B2
(45) Date of Patent: Apr. 15, 2008

(54) FLUID CONTROL DEVICES

(75) Inventor: Steven B. Lonnes, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 294 days.

(21) Appl. No.: 10/569,932

(22) PCT Filed: Sep. 14, 2004

(86) PCT No.: PCT/US2004/029837

§ 371 (c)(1),
(2), (4) Date: Feb. 27, 2006

(87) PCT Pub. No.: WO2005/028931

PCT Pub. Date: Mar. 31, 2005

(65) Prior Publication Data

US 2006/0266420 A1 Nov. 30, 2006

Related U.S. Application Data

(60) Provisional application No. 60/503,019, filed on Sep. 15, 2003.

(51) Int. Cl.
*F16K 17/04* (2006.01)
(52) U.S. Cl. ............... 137/509; 251/282; 251/332
(58) Field of Classification Search ........... 137/496, 137/509, 510; 251/282, 332
See application file for complete search history.

(56) References Cited

U.S. PATENT DOCUMENTS

| 3,236,256 A | 2/1966 | Valentine ............... 137/509 |
| 3,430,652 A * | 3/1969 | Struck ................... 137/509 |
| 3,752,439 A | 8/1973 | Thomas .................. 251/121 |
| 4,072,165 A * | 2/1978 | Bradley, Jr. ............ 137/509 |
| 4,175,585 A * | 11/1979 | Boehme ................. 137/509 |
| 5,123,442 A | 6/1992 | Geuy et al. ............. 135/495 |
| 5,312,085 A | 5/1994 | Yokoyama et al. ...... 251/121 |
| 5,618,025 A | 4/1997 | Barron et al. ............ 251/210 |
| 5,851,002 A | 12/1998 | Carter .................... 251/121 |
| 5,911,239 A | 6/1999 | Barthalow et al. ...... 137/599.2 |
| 6,024,114 A | 2/2000 | Thomas et al. .......... 137/244 |
| 6,202,681 B1 | 3/2001 | Kouketsu et al. ........ 137/488 |
| 6,230,734 B1 | 5/2001 | Grebnev et al. ......... 137/220 |
| 6,298,879 B1 | 10/2001 | Knapp .................. 137/625.31 |
| 6,360,772 B1 | 3/2002 | Wu ...................... 137/486 |
| 2003/0131889 A1 | 7/2003 | Kim ..................... 137/491 |

FOREIGN PATENT DOCUMENTS

| EP | 0060549 | 9/1982 |
| EP | 0389074 | 9/1990 |
| GB | 2 184 814 A | 7/1987 |

OTHER PUBLICATIONS

EP Search Report #RS 110643 dated Apr. 27, 2004, 2 pgs.
PCT International Search Report & Written Opinion dated Feb. 9, 2005, 5 pgs.

* cited by examiner

*Primary Examiner*—Stephen M Hepperle

(57) ABSTRACT

Improved fluid control devices are provided for metering pressure effectively in environments that may contain solid particles and in which the ambient pressure is subject to change. Such a valve comprises a valve body containing a plunger assembly contacting a first spring, said plunger assembly having a cavity and including a second spring and a poppet assembly engaged to said second spring within said cavity; and valve seat means located in position to contact said poppet assembly and essentially prohibit flow through the valve when fluid pressure at the valve inlet is less than a predetermined differential pressure plus a fluid pressure at the valve outlet.

11 Claims, 2 Drawing Sheets

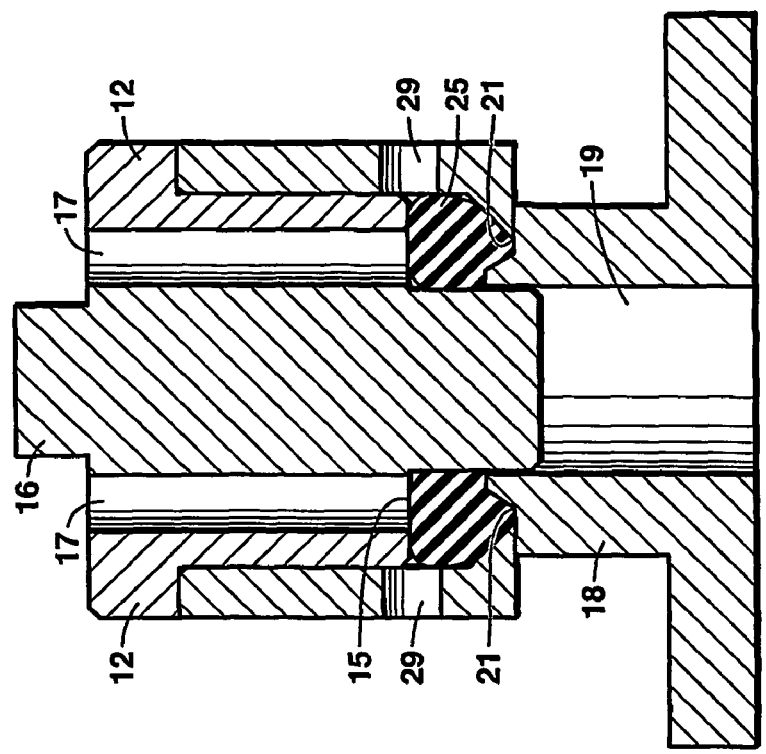
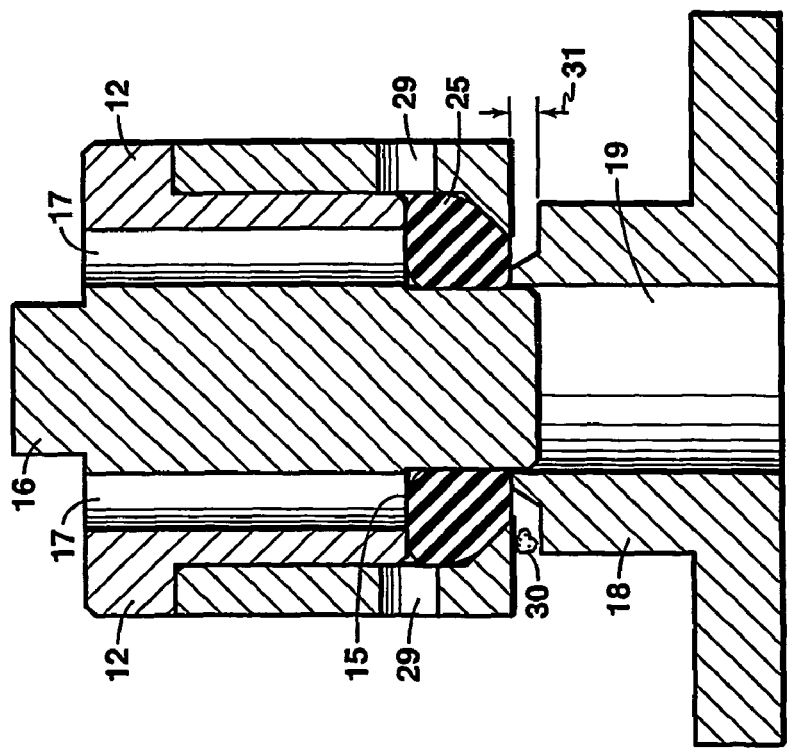

FLUID CONTROL DEVICES

This application is the National Stage of International Application No. PCT/US04/029837, filed 14 Sep. 2004, which claims the benefit of U.S. Provisional Patent Application No. 60/503,019, filed 15 Sep. 2003.

FIELD OF THE INVENTION

This invention pertains to fluid control devices for metering, maintaining, and isolating fluid pressure and flow between two or more sources.

BACKGROUND OF THE INVENTION

Fluid control is routinely practiced within a wide variety of industries. Control is typically achieved using devices that are specifically designed to perform a unique control operation. Examples of such control devices are pressure relief valves, pressure regulators, back-pressure regulators, velocity fuses, mass flow controllers, pilot operated valves, check valves, and shuttle valves.

Pressure is typically communicated from one source to another via the flow of a fluid such as gas or a liquid. Operational challenges arise when the flow used to communicate pressure causes damage to the sealing element that is designed to maintain the desired pressure difference. Damage can occur from the cutting capacity of high velocity fluid streams passing over a device's sealing component during the pressure maintenance operations required to continuously sustain the required differential pressure. For applications that require the maintenance of high differential pressures, devices typically use sealing elements fabricated from durable rigid materials such as metal or thermoplastics. While these materials are durable, they are not pliable. The lack of pliability results in reduced performance in the presence of particulate matter and reduced performance from surface imperfections on the sealing element or the component that the sealing element seals against, i.e., the seat.

For example, a steel ball could never seal a circular steel aperture if a sand grain was wedged between the steel ball and the edge of the aperture (or if the edge of the aperture was slightly nicked). If the ball was made of a pliable material such as rubber, the ball could seal the circular aperture because the sand grain could imbed in the ball and the ball could then fully contact the perimeter of aperture. While the rubber ball is a superior sealing material, it is also highly susceptible to damage from the cutting action of high velocity fluid streams. Thus, a technology gap exists for pressure metering applications that require high differential pressures, particulate insensitivity, and reliable repeatable operation. For applications that require zero leak flow after a pressure differential is established and/or require cyclic operations, the use of rigid seal elements becomes inadequate.

Many valving designs directly, or indirectly, involve three pressures: 1.) inline high pressure source; 2.) inline low pressure source; and 3.) a static pressure source, e.g., atmospheric pressure in a spring cavity. Valve designs that involve an isolated, or sealed, static pressure exhibit limited functionality in a downhole environment. The primary reason is that most downhole operations are performed in a well that is filled with liquid, thus the static pressure increases as a function of depth. This change in static pressure results in a change in valve performance as a function of depth. Valve designs that provide free static pressure communication to all actuating parts within the system enable depth (or static pressure) independence. This is because fluid based valve actuation forces result from differential pressures acting upon an area. Since the actuation forces are based on the difference between pressure sources, the reference pressure (or static pressure) that is common to all sources is canceled out, and the performance of the valve becomes depth independent.

An additional criteria required of downhole fluid control operations is related to size. Wellbores of various diameters are created in an effort to optimize the economic impact of a field development; and valves must be smaller than the wellbore diameter in which they are deployed. As a result, valves with small external dimensions possess a larger portfolio of accessible intervention wells than larger valves of similar function. In addition, when valves are deployed downhole they are not readily accessible for servicing; thus significant expense is typically incurred during the downhole intervention activity. Consequently, small fluid control devices are sought that are static pressure independent systems capable of repeatable, reliable, particulate insensitive performance in service conditions that require high pressure differentials. The remainder of the document will focus on a pressure relief/back-pressure valve that is compatible with downhole service.

Pressure control devices that are designed to maintain high differential pressures by fluid metering past a sealing component are typically constructed using rigid seal materials that are durable when exposed to high velocity fluid jets, or the pressure control devices are de-rated in pressure to the point that more pliable seal materials are acceptable for the specified service conditions. For example, the Circle Seal 5300 pressure relief device is designed to function at differential pressures up to 72 MPa (10500 psi). For these high differential pressures, the seal materials available for this valve are either metal or a rigid thermoplastic. The Swagelok R4 series pressure relief valve is designed to operate at differential pressures up to only 10 MPa (1500 psi). The lower differential pressure rating allows the seal materials for the R4 to be fabricated out of pliable elastomer compounds such as VITON, BUNA N, or NEOPRENE. Both of the aforementioned valves are three pressure systems (i.e., the spring cavity resides at atmospheric pressure).

The Circle Seal 5100 pressure relief valve is a two pressure system that contains a pliable seal material, but the maximum differential pressure rating is only 16.5 MPa (2400 psi). The Kepner 1354 pressure relief valve is a two pressure system that contains a pliable seal material, but the maximum differential pressure rating is only 13.8 MPa (2000 psi). These examples illustrate the inherent conflict between high differential pressure maintenance and reliable sealability in environments that may contain solid particles.

A need exists for valves that will meter pressure effectively in environments, such as downhole environments, that may contain solid particles and in which the ambient pressure to which the valve will be exposed during operation is subject to change, due to factors such as the need to change depths in a downhole environment. An object of this invention is to provide such valves. Other objects will become apparent through consideration of the following specification together with the accompanying drawings.

SUMMARY OF THE INVENTION

In one embodiment, the present invention is a pressure-actuated valve comprising: (a) a valve body with an inlet orifice and an outlet orifice, and a first cavity and a second cavity disposed between said inlet and outlet orifices, said two cavities being in communication with each other through a first passageway and a second passageway, said inlet orifice providing communication between said second cavity and outside the valve body and said outlet orifice providing communication between said first cavity and outside the valve body; (b) a plunger movably disposed in said second cavity and extending through said first passageway into said first cavity, said plunger containing a poppet disposed in a chamber within said plunger, said poppet movably attached to the plunger by a first spring, said plunger chamber having an opening of smaller dimensions than said poppet; (c) a second spring disposed under compression in said first cavity and in contact with said plunger such that motion of the plunger further compresses or relaxes the second spring; (d) a valve seat with a central seat orifice, mounted within said valve body and disposed where said second passageway enters said second cavity, to sealingly engage said poppet through the opening in the plunger chamber, thereby closing said second passageway and placing the valve in its "off" position, said seat orifice being of smaller area than said first passageway's cross section; and (e) a seal to prevent fluid passage through said first passageway between said two cavities; wherein, in operation, said two cavities are filled with fluid (possibly containing small solids) at different pressures, the fluid in the second cavity being at higher and increasing pressure, and the poppet remains in contact with the valve seat due both to the pressure differential and force from the first spring under compression until the fluid pressure in the second cavity exceeds that in the first cavity sufficiently to cause the plunger to move toward the first cavity against resistance due to compression of the second spring, eventually bringing the plunger chamber opening into contact with the poppet pulling the poppet off the valve seat and thus placing the valve in its "on" position and allowing the fluid to flow out the outlet until the pressure differential reverses sufficiently to permit the compressed second spring to move the poppet back into engagement with the seat halting the flow, said first spring being sized to be under compression at all times.

In some embodiments, the valve body is formed for cartridge-style deployment. In some embodiments, outlet flow is axial whereas in other embodiments it is perpendicular to the valve axis.

DESCRIPTION OF THE DRAWINGS

The advantages of the present invention will be better understood by referring to the following detailed description and the attached drawings in which:

FIGS. 2A and 2B illustrate one embodiment of a poppet and seat of a valve according to this invention.

While the invention will be described in connection with its preferred embodiments, it will be understood that the invention is not limited thereto. To the extent that the following description is specific to a particular embodiment or a particular use of the invention, this is intended to be illustrative only, and is not to be construed as limiting the scope of the invention. On the contrary, the invention is intended to cover all alternatives, modifications, and equivalents which may be included within the spirit and scope of the present disclosure, as defined by the appended claims.

DETAILED DESCRIPTION OF THE INVENTION

The following discussion describes the invention within the context of oilfield downhole intervention technology, although the invention is not limited to such use.

A valve according to this invention is designed to maintain a pre-set differential pressure across the valve, regardless of the inlet pressure. For example, if the valve is closed (i.e., the pre-set differential pressure exists across the valve) and the inlet pressure is increased, the valve will open and communicate flow to the outlet until the outlet pressure (back-pressure) increases sufficiently that the differential pressure across the valve equals the pre-set differential pressure, at which time the valve closes and maintains a leak-tight seal. For example, if the valve is set to maintain a 20.6 MPa (3000 psi) differential pressure, an inlet pressure of 20.6 MPa (3000 psi) with an outlet pressure of zero will result in zero flow through the valve. An inlet pressure of 27.6 MPa (4000 psi) will result in flow through the valve until the outlet pressure increases to 7 MPa (1000 psi). An inlet pressure of 48.3 MPa (7000 psi) will result in flow through the valve until the outlet pressure increases to 27.7 MPa (4000 psi). The pre-set differential pressure may be set by means well known to those skilled in the art.

Figure 1A:
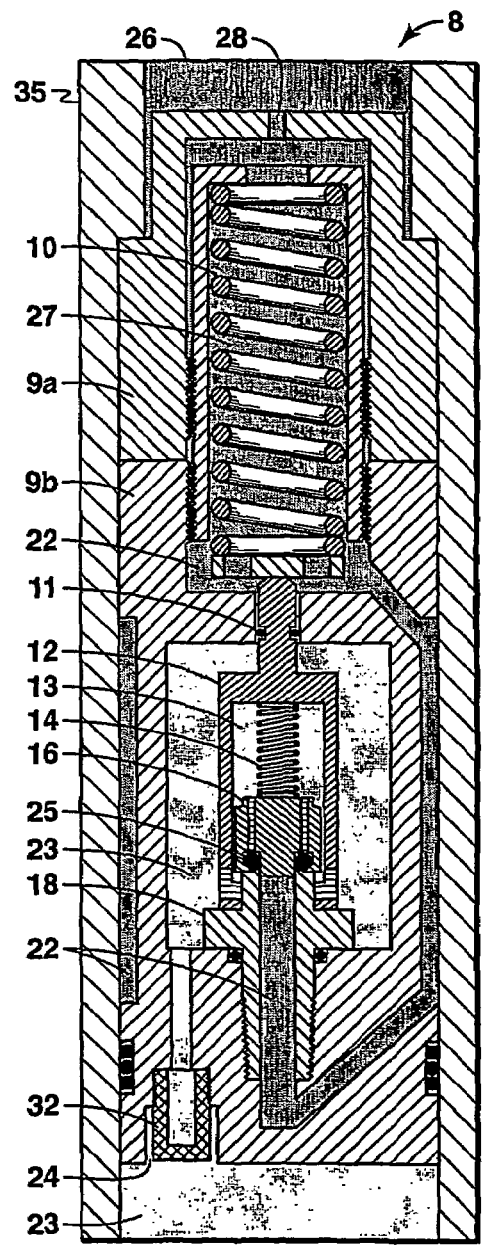
FIG. 1A illustrates a valve according to this invention in the closed position.
Figure 1B:
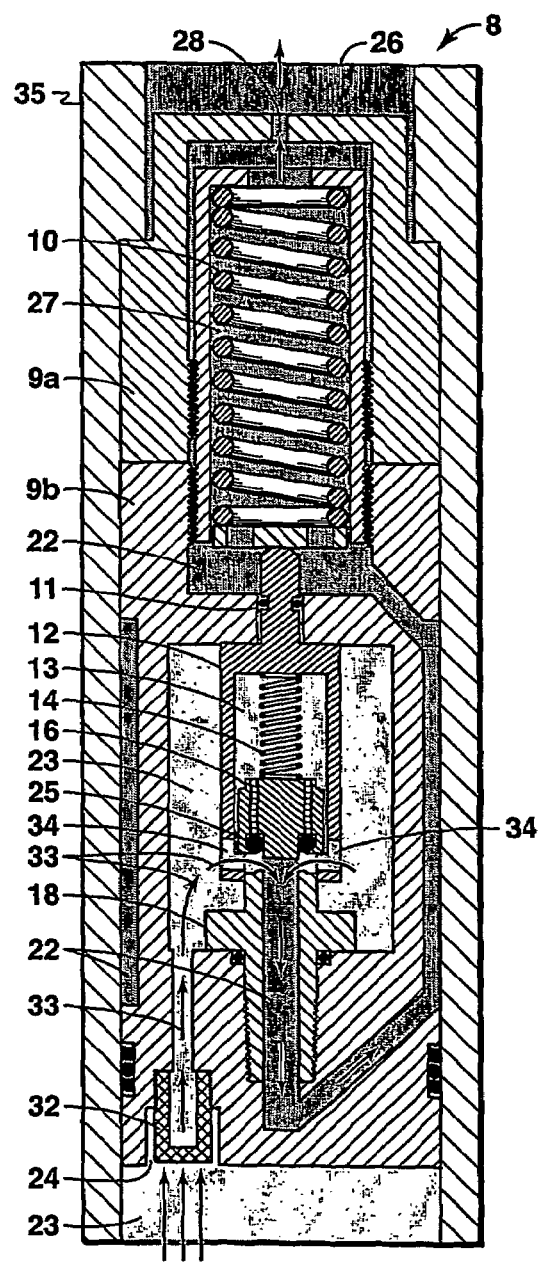
FIG. 1B illustrates a valve according to this invention in the open position.

FIGS. 1A and 1B illustrate one open-and-close actuation of a fluid control valve according to this invention. FIGS. 2A and 2B illustrate one embodiment of a poppet and seat of a valve according to this invention. Referring now to FIG. 1A, a valve 8 according to this invention comprises a valve body top 9a and valve body bottom 9b, a large spring 10, a plunger 12, a small spring 14, and a poppet 16. A fluid pressure force from high pressure fluid 23 may act at cross-sectional pressure location area 11 to move plunger 12 up, i.e., toward low pressure fluid 22. Plunger 12 moves axially and its motion is governed by a force balance between the downward force exerted by large spring 10 and the upward force exerted by high pressure fluid 23 at cross-sectional pressure location area 11. Poppet 16 is contained within plunger cavity 13 and is free to move axially within plunger cavity 13, independent of the movement of plunger 12.

Valve 8 is in the closed position when the downward force exerted by large spring 10 is greater than the upward force exerted by high pressure fluid 23 at cross-sectional pressure location area 11 and the resulting downward force pushes down on plunger 12 and holds it against seat 18. Referring to FIG. 2A, poppet 16 rests on seat 18 and resides at an intermediate axial location within plunger cavity 13 (see FIG. 1A). A substantially leak-tight seal is provided by poppet 16 as it is forced onto seat 18 under the influence of the differential pressure acting across poppet 16 plus the force from small spring 14 (see FIG. 1A). Ventilation holes 17 in poppet 16 allow the differential pressure exerted on poppet 16 to act on seal 25 (e.g., O-ring 25) in poppet 16 and force seal 25 into the crevice 21 between poppet nub 15 and seat orifice 19, thus providing a leak-tight seal.

Referring now to FIG. 1B, as pressure exerted by high pressure fluid 23 entering through inlet 24 increases such that the differential pressure across valve 8 is above the pre-set cracking pressure of valve 8, the pressure force at cross-sectional pressure location area 11 overcomes the force of large spring 10 (plus any breakaway friction force of O-ring 25) and lifts plunger 12 up. As plunger 12 moves up, the base of the plunger cavity 13 contacts poppet 16 and pulls poppet 16 off of seat 18. Plunger 12 and poppet 16 move away from seat 18. This enables flow through ventilation holes 34 in the lower region of plunger 12, past poppet 16, through seat orifice 19, out to the annular region between valve body 9a and 9b and valve confiner 35, back into valve body 9a and 9b, through large spring cavity 27, and out flow rate limiting exit orifice 28. Direction arrows 33 indicate the direction of flow.

Flow passes through valve 8 until the pressure at outlet 26 (back-pressure) begins to increase, i.e., the pressure in large spring cavity 27. As the back-pressure increases, the force from large spring 10 plus the downward acting back-pressure force at cross-sectional pressure location area 11 begins to overcome the inlet fluid pressure force at cross-sectional pressure location area 11 that acts to hold up plunger 12. As plunger 12, containing poppet 16, moves down, flow through valve 8 begins to be restricted between poppet nub 15 and the top edge of seat orifice 19.

Flow continues through valve 8 at a reduced rate until poppet nub 15 begins to enter seat orifice 19. When poppet nub 15 enters seat orifice 19, the flow rate through valve 8 is significantly reduced. The reduced flow rate decreases the cutting capacity of the fluid stream passing by poppet 16, thus providing a degree of protection for O-ring 25. In addition, the reduced flow rate decreases the potential for a venturi type low pressure field to extract O-ring 25 from O-ring gland 29 in poppet 16.

As the back-pressure reaches the reseat pressure of valve 8, O-ring 25 contacts the top of seat 18 and initiates the sealing process. The differential pressure across O-ring 25 (provided to O-ring 25 through the poppet ventilation holes 17) drives O-ring 25 into the crevice 21 between poppet nub 15 and seat orifice 19. Poppet ventilation holes 17 also provide a means of equalizing the static pressure around O-ring 25 as valve 8, including O-ring 25, passes from surface conditions (installation of O-ring 25 occurred) into the high temperature and high static pressure service conditions characteristic of the downhole environment.

The poppet contact surface on seat 18 is designed with a relieved profile so that if a particle became lodged between seat 18 and poppet 16, O-ring 25 could still seal crevice 21 between poppet nub 15 and seat orifice 19. The maximum allowable particulate size 30 that could be accommodated by valve 8 is proportional to the axial distance 31 from the top edge of seat 18 to the depth of the relieved seat profile. Inlet filter 32 to valve 8 is sized to restrict the particle sizes entering valve 8 to a value less than axial distance 31. If there is no particulate present, the relieved depth provides a maximum depth (axial distance 31) that seal 25 can protrude into crevice 21. This protects O-ring 25 from unnecessary compression loading that could compromise the integrity and longevity of the seal.

The O-ring in the poppet is preferably protected from damage by: 1.) its recessed location within the poppet that prevents high velocity fluid impingement on the soft elastomer material; 2.) a reduction in flow rate as the poppet nub enters the seat orifice, this reduces the cutting capacity of the fluid passing by the poppet; 3.) an exit orifice that limits the maximum rate through the valve; 4.) using a 90 Shore A durometer O-ring material that prevents low pressure venturi extraction of the O-ring during high flow operations; and 5.) a pre-set axial relieved distance on the seat to prevent unnecessary compression loading that could compromise the integrity and longevity of the seal.

Another feature of a valve according to this invention is related to the exit direction that flow can issue from the valve. If exit flow is desired at a location 90 degrees to the axis of the valve, an exit port can be provided in the cartridge valve enclosing cavity that intersects the annular fluid filled region between the external body of the valve and the enclosing cavity. If needed, the flow rate limiting exit orifice can be moved and inserted into the passage exiting the valve body from the seat. In addition, the body of the valve can also be adjusted to be in the form of a cartridge valve that has a threaded region on the body to anchor the valve into the associated cartridge valve cavity. The valve body design illustrated in FIG. 2A requires a cap or an abutting body to secure the valve within the cartridge valve cavity.

In a broad sense, the poppet's seal material could be an elastomer bonded to a metal surface, an O-ring, an O-ring or elastomer material mounted to the seat. VITON may be used, however, VITON has the tendency to become brittle in water and this phenomenon is exacerbated at elevated temperature. Elastomers such as HNBR (Hydrogenated Nitrile) offer a potential solution if the range of potential user applied loads (preset pressures) does not exceed the performance limitations of the bonded elastomer material.

EXAMPLE

In this example, a fluid control device according to this invention is constructed by modification of a commercially available Circle Seal Controls Inc. (a division of CIRCOR) 5300 series pressure relief valve. Modifications include: (1) discarding the valve body and machining a new valve body that preserved the interior profile but altered the exterior geometry to reflect a cartridge valve style with the ability to flow axially through the valve or at a 90 degree angle to the valve axis; (2) modifying the valve from a three pressure system to a two pressure system by directing the exit flow into the spring cavity, thus changing the functionality to enable the valve to sense and actuate when the outlet pressure changes; (3) integrating an inlet filter into the valve body to allow fluid filtering to a particle size less than the seal mechanism design limit; (4) discarding the rigid Circle Seal 5300 poppet and replacing it with a specially designed poppet containing a pliable elastomer O-ring based seal; (5) machining the seat to provide a profile that allows the valve to accommodate particle sizes that are less than or equal to the inlet filter size; (6) modifying the axial fluid exit from the valve to contain a throttling orifice to restrict the flow rate from the valve to suit the requirements of the downhole application and also to limit the velocity of the fluid passing over the seal; (7) re-machining the poppet housing to accommodate the unique geometry of the newly designed poppet; and (8) integrating threaded taps into the valve body to enable installation and removal of the valve from its confining cavity.

The modified Circle Seal 5300 with the O-ring based poppet has been successfully tested in the laboratory at crack and reseat pressures of 24.1 MPa (3500 psi) and 22.1 MPa (3200 psi), respectively, at temperatures up to approximately 129° C. (265° F.).

An example of a possible application for the aforementioned pressure relief/back-pressure valve is in the area of inflatable packer deployment using coiled tubing. For this example, it is assumed that an inflatable packer would be connected to the end of a coiled tubing string, and a fluid communication port would be placed on the end of the coiled tubing above the packer. The purpose of the communication port would be to enable flow down the coiled tubing, out the communication port, and up the annulus between the coiled tubing and casing to the surface. This type of flow is typically referred to as circulation. It is also assumed that the communication port could be closed as needed so that the coiled tubing could be pressurized to inflate the packer.

For various reasons it is desirable to circulate fluid through coiled tubing while moving the coiled tubing within a wellbore. Pressure must be applied to coiled tubing to drive circulation flow. Since an inflatable packer is pressure actuated, the initiation of coiled tubing flow initiates the inflation of the packer. An inflated packer prevents motion of the coiled tubing in the wellbore, thus a conflict exists between circulation and coiled tubing movement.

A solution to the problem exists if a device could prevent the communication of pressure and flow to the packer while circulation activities occur, and then open when packer inflation is desired. The aforementioned pressure relief/back-pressure valve could provide this functionality. For this example it assumed that the crack pressure of the valve is 24.1 MPa (3500 psi) and the reseat pressure is 20.6 MPa (3000 psi), where the crack pressure is defined as the pressure at which flow is initiated through the valve and the reseat pressure is defined as the pressure at which flow terminates through the valve. If it is assumed that the modified Circle Seal 5300 provides the gateway for fluid to enter the packer, then no fluid would enter the packer as long as the pressure within the coiled tubing remains less than the crack pressure of the modified Circle Seal 5300, 24.1 MPa (3500 psi). Consequently, circulation and coiled tubing movement activities could occur freely while the coiled tubing pressure was maintained less than the modified Circle Seal 5300 crack pressure.

When packer inflation was desired, the communication port between the coiled tubing and annulus could be closed, and the coiled tubing pressure could be increased to a pressure greater than the modified Circle Seal 5300 crack pressure, 24.1 Mpa (3500 psi). The poppet would then lift off the seat and allow flow into the packer. Fluid would freely pass into the packer until the back-pressure (packer pressure) increased to the point that the modified Circle Seal 5300 closed. At this point a differential pressure would exist between the coiled tubing and the packer, and this value would correspond to the reseat pressure of the valve, 20.6 MPa (3000 psi).

For example, if was assumed that the coiled tubing pressure was elevated to 48.3 MPa (7000 psi), then flow would continue to enter the packer until its pressure reached 27.6 MPa (4000 psi), the valve would then reseat and provide a pressure-tight seal. For this particular case a pressure-tight seal would be critical to insuring a successful deployment. A small leak through the valve would result in a rapid increase in the packer pressure. This rapid pressure rise would occur because an inflated packer acts as a small volume rigid container and liquids are a relatively incompressible media. Very little flow into such an uncompromising fluid system yields a significant pressure response. Thus, any small leak could potentially damage or fail the packer due to exposure to excessive internal pressures. Use of a valve according to this invention, would prevent such a leak from occurring.

Although this invention is well suited for use in oilfield downhole intervention technology, it is not limited thereto; rather, this invention is suitable for any application where fluid control is required. Additionally, while the present invention has been described in terms of one or more preferred embodiments, it is to be understood that other modifications may be made without departing from the scope of the invention, which is set forth in the claims below.

I claim:

1. A pressure-actuated valve comprising:
   (a) a valve body with an inlet orifice and an outlet orifice, and a first cavity and a second cavity disposed between said inlet and outlet orifices, said two cavities being in communication with each other through a first passageway and a second passageway, said inlet orifice providing communication between said second cavity and outside the valve body and said outlet orifice providing communication between said first cavity and outside the valve body;
   (b) a plunger movably disposed in said second cavity and extending through said first passageway into said first cavity, said plunger containing a poppet disposed in a chamber within said plunger, said poppet movably attached to the plunger by a first spring, said plunger chamber having an opening of smaller dimensions than said poppet;
   (c) a second spring disposed under compression in said first cavity and in contact with said plunger such that motion of the plunger further compresses or relaxes the second spring;
   (d) a valve seat with a central seat orifice, mounted within said valve body and disposed where said second passageway enters said second cavity, to sealingly engage said poppet through the opening in the plunger chamber, thereby closing said second passageway and placing the valve in its "off" position, said seat orifice being of smaller area than said first passageway's cross section; and
   (e) a seal to prevent fluid passage through said first passageway between said two cavities;
   wherein, in operation, said two cavities are filled with fluid (possibly containing small solids) at different pressures, the fluid in the second cavity being at higher and increasing pressure, and the poppet remains in contact with the valve seat due both to the pressure differential and force from the first spring under compression until the fluid pressure in the second cavity exceeds that in the first cavity sufficiently to cause the plunger to move toward the first cavity against resistance due to compression of the second spring, eventually bringing the plunger chamber opening into contact with the poppet pulling the poppet off the valve seat and thus placing the valve in its "on" position and allowing the fluid to flow out the outlet until the pressure differential reverses sufficiently to permit the compressed second spring to move the poppet back into engagement with the seat halting the flow, said first spring being sized to be under compression at all times.

2. The valve of claim 1, wherein said poppet includes an elastomer O-ring disposed on the poppet so as to make sealing contact with the valve seat when the valve is closed, and a nub end that is sized to pass within said valve seat orifice such that, during closing of the valve, the nub enters the seat orifice before the poppet engages the seat, thus reducing fluid flow through the valve before total shutoff occurs.

3. The valve of claim 2, wherein said poppet includes ventilation holes providing communication between said O-ring and said plunger chamber, thereby assisting the O-ring to seal during valve closure.

4. The valve of claim 2, wherein said valve seat includes a relieved profile such that if a small particle prevents full engagement between the valve seat and said poppet, said O-ring still seals between said poppet nub and said seat orifice thus closing the valve.

5. The valve of claim 4, further comprising an inlet filter sized to prevent passage of particles greater in size than said O-ring and said relieved profile can accommodate.

6. The valve of claim 1, wherein said valve body is formed for cartridge-style deployment.

7. The valve of claim 6, wherein said outlet orifice is disposed so as to direct fluid flow in an axial direction out of said cartridge.

8. The valve of claim 6, wherein said outlet orifice is disposed so as to direct fluid flow perpendicular to said cartridge's axis.

9. The valve of claim 1, wherein said poppet includes an elastomer bonded to it and disposed so as to seal against said valve seat when the valve is closed.

10. The valve of claim 1, wherein said valve seat includes an elastomer bonded to it and disposed so as to seal against said poppet when the valve is closed.

11. The valve of claim 1, wherein said outlet orifice's dimensions are governed by maximum flow rate considerations for the valve.

* * * * *